(12) United States Patent
McLeod

(10) Patent No.: US 12,200,090 B1
(45) Date of Patent: Jan. 14, 2025

(54) MULTIPHASE CLOCK GENERATION WITH AUTOMATIC SKEW AND AMPLITUDE CONTROL

(71) Applicant: Acacia Communications, Inc., Maynard, MA (US)

(72) Inventor: Scott McLeod, Redwood City, CA (US)

( * ) Notice: Subject to any disclaimer, the term of this patent is extended or adjusted under 35 U.S.C. 154(b) by 159 days.

(21) Appl. No.: 18/106,047

(22) Filed: Feb. 6, 2023

Related U.S. Application Data

(60) Provisional application No. 63/314,158, filed on Feb. 25, 2022.

(51) Int. Cl.
*G06F 1/08* (2006.01)
*H04L 7/00* (2006.01)

(52) U.S. Cl.
CPC .............. *H04L 7/0025* (2013.01); *G06F 1/08* (2013.01)

(58) Field of Classification Search
CPC ..... G06F 1/08; G06F 1/10; G06F 1/04; G06F 1/12; G06F 1/14
See application file for complete search history.

(56) References Cited

U.S. PATENT DOCUMENTS

| | | | | |
|---|---|---|---|---|
| 2003/0214335 A1* | 11/2003 | Saeki | ................... | H04L 7/0337 327/165 |
| 2011/0050312 A1* | 3/2011 | Fujino | .................. | H03K 5/1565 327/237 |
| 2019/0305865 A1* | 10/2019 | Loinaz | .................. | H04J 3/0658 |
| 2021/0026396 A1* | 1/2021 | Chien | .................. | H03L 7/0807 |
| 2023/0170890 A1* | 6/2023 | Tsai | ........................ | H03K 5/135 |

* cited by examiner

*Primary Examiner* — Raymond N Phan
(74) *Attorney, Agent, or Firm* — K&L Gates LLP

(57) ABSTRACT

Systems and methods are disclosed for a multiphase clock generation. An example method includes facilitating, by a phase interpolator (PI) circuit comprising a plurality of PIs, transfer of information across one or both of a transmit (TX) lane or a receive (RX) lane, wherein the transfer of information is based on a clock timing. The PI circuit receives, from a clock-and-data recovery (CDR) circuit, a plurality of input clock phases. The CDR circuit comprises a centrally located phase-locked loop (PLL) circuit and a plurality of multiphase generators. In some embodiments, each multiphase generator of the plurality of multiphase generators is adjacent to a respective PI of the plurality of PIs. Based on the plurality of input clock phases, the PI circuit adjusts, the clock timing for the transfer of information.

20 Claims, 5 Drawing Sheets

MULTIPHASE CLOCK GENERATION WITH AUTOMATIC SKEW AND AMPLITUDE CONTROL

CROSS REFERENCE TO RELATED APPLICATIONS

This application, which claims priority to and the benefit of U.S. Provisional Application No. 63/314,158, filed on Feb. 25, 2022, the entire disclosure of which is incorporated by reference herein.

FIELD

This disclosure relates generally to the field of clock generation in integrated circuits.

BACKGROUND

Contemporary telecommunications systems make extensive use of integrated circuits that are advantageously mass-produced in various configurations for various purposes.

SUMMARY

Various embodiments of the present disclosure relate to systems and methods for multi-phase clock generation. In one embodiment, a four-phase clock may be generated. Two clock phases may be generated centrally, while the other two clock phases may be generated locally by multi-phase generator (MPG) circuits in transmit and receive lanes. The centrally generated clock signals may be generated directly at the target frequency, instead of using a clock source at twice the target frequency followed by a divide-by-two circuit. The absence of a divide-by-two circuit, operation at the target frequency instead of twice the target frequency, and the reduced distribution network of two phases instead of four all serve to reduce power consumption and die area. By serving transmit and receive lanes locally, MPGs may not drive large interconnects and so may not require inductors for resonance. Thus MPGs may not induce magnetic coupling with other circuits. In some embodiments, MPG circuits may be able to sense and adjust for clock phase skew (e.g., via a skew-correction loop) and amplitude error (e.g., via an amplitude-correction loop). The error-sensing circuit may consume less (e.g., zero) power, occupy minimal area, and impose a reduced (e.g., only a small amount of) load on the MPG's outputs. The skew-correction loop may have the ability for a programmable amount of skew to be intentionally introduced into the MPG's outputs for testing or debugging. Likewise, the amplitude-correction loop may provide similar functions and/or may confer similar benefits. In part, in one aspect, the disclosure relates to a system for multi-phase clock generation. The system may include a phase interpolator (PI) circuit that includes a plurality of PIs for adjusting a clock timing based on a plurality of input clock phases received from a clock-and-data recovery (CDR) circuit; and the CDR circuit, wherein the CDR circuit may include a phase-locked loop (PLL) circuit centrally located on the CDR circuit; and a plurality of multiphase generators, wherein each multiphase generator is local to a respective PI of the plurality of PIs; wherein the PLL circuit centrally generates input clock phases at 0 and 180 degrees for the PI circuit; wherein the plurality of input clock phases includes the input clock phases at 0 and 180 degrees; and wherein the plurality of multiphase generators locally generate remaining input clock phases of the plurality of input clock phases for the PI circuit. In one embodiment, the PLL circuit and the plurality of multiphase generators each operate at the highest frequency of the CDR circuit. In one embodiment, the PLL circuit and the plurality of multiphase generators each operate at about 28 GHz. In one embodiment, the system further includes a plurality of lanes for transmitting, from the CDR circuit to the PI circuit, the plurality of input clock phases, wherein the plurality of lanes include one or more central lanes and a plurality of local lanes; wherein the PLL circuit generates the input clock phases at 0 and 180 degrees on the one or more central lanes; wherein the plurality of multiphase generators locally generate the remaining input clock phases on the plurality of local lanes; wherein each of the plurality of multiphase generators and the PLL circuit are evenly spaced. In one embodiment, each PI of the plurality of PIs is associated with a transmit (TX) lane and a receive (RX) lane. In one embodiment, each multiphase generator of the plurality of multiphase generators includes a clock phase skew sensing circuit; and an amplitude error sensing circuit. In one embodiment, each multiphase generator further includes an injection-locked oscillator (ILO) circuit, wherein the ILO circuit generates multiple clock phases at frequencies that are multiples of a frequency of an input clock phase associated with the multiphase generator. In one embodiment, one or both of the clock phase skew sensing circuit or the amplitude error sensing circuit adjusts an internal supply voltage of the ILO circuit. In one embodiment, the remaining input clock phases generated by the plurality of multiphase generators are at 90 and 270 degrees. In one embodiment, the remaining input clock phases generated by the plurality of multiphase generators are at 45, 90, 135, 225, 270, and 315 degrees. In part, in one aspect, the disclosure relates to a method for multiphase clock generation. The method may include facilitating, by a phase interpolator (PI) circuit that includes a plurality of PIs, transfer of information across one or both of a transmit (TX) lane or a receive (RX) lane, wherein the transfer of information is based on a clock timing; receiving, by the PI circuit, from a clock-and-data recovery (CDR) circuit, a plurality of input clock phases, wherein the CDR circuit includes a phase-locked loop (PLL) circuit and a plurality of multiphase generators, wherein each multiphase generator of the plurality of multiphase generators is adjacent to a respective PI of the plurality of PIs; and adjusting, by the PI circuit and based on the plurality of input clock phases, the clock timing. In one embodiment, the receiving the plurality of input clock phases includes receiving, from the PLL circuit, input clock phases at 0 and 180 degrees. In one embodiment, the receiving the plurality of input clock phases further includes receiving, from the multiphase generators, input clock phases at 90 and 270 degrees. In one embodiment, the PLL circuit and the plurality of multiphase generators each operate at the highest frequency of the CDR circuit. In one embodiment, the PLL circuit and the plurality of multiphase generators each operate at about 28 GHz. In part, in one aspect, the disclosure relates to a system for multiphase clock generation. The system may include a phase interpolator (PI) circuit that includes a plurality of PIs, wherein each PI is associated with a transmit (TX) lane and a receive (RX) lane; a plurality of multiphase generators, wherein each multiphase generator is local to a respective PI of the plurality of PIs; and a phase-locked loop (PLL) circuit that is centrally located relative to the plurality of PIs; wherein the PI circuit is configured to: facilitate transfer of information across one or both of a transmit (TX) lane or a receive (RX) lane; receive, from the plurality of multiphase generators and the PLL circuit, a plurality of input clock phases, wherein the PLL circuit generates input clock phases at 0 and 180 degrees; and adjust, based on the plurality of input clock phases, a clock timing for the transfer of information. In one embodiment, the plurality of multiphase generators generate input clock phases at 90 and 270 degrees. In one embodiment, each multiphase generator of the plurality of multiphase generators includes a clock phase skew sensing circuit; and an amplitude error sensing circuit. In one embodiment, each multiphase generator further includes an injection-locked oscillator (ILO) circuit, wherein the ILO circuit generates multiple clock phases at frequencies that are multiples of a frequency of an input clock phase of the plurality of input clock phases. In one embodiment, one or both of the clock phase skew sensing circuit or the amplitude error sensing circuit adjusts an internal supply voltage of the ILO circuit.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, phase locked loops, circuit elements, signal processors, coatings/layers, optical paths, waveguides, splitters, couplers, combiners, electro-optical devices, inputs, outputs, ports, multi-phase generators, channels, components and parts of the foregoing disclosed herein can be used with any laser, laser-based communication system, waveguide, fiber, transmitter, transceiver, receiver, and other devices and systems without limitation.

These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

High-speed data converters, i.e. digital-to-analog converters (DACs) and analog-to-digital converters (ADCs), and serializer/deserializer (SerDes) macros use a high-frequency clock to time their transmit and receive functions. This clock may be adjusted to be properly aligned to the data stream being transmitted or received in order to sample the data bits at the correct timing instants—midway between the bits' transitions—and thus maximize the signal-to-noise ratio (SNR). A phase interpolator (PI) circuit typically accomplishes this timing adjustment by advancing or retarding the clock in response to a control signal that is generated by some alignment circuit such as a clock-and-data recovery (CDR) circuit. The CDR strives to position the PI output clock at the data bits' midpoints.

A PI requires a minimum of four clock phases to perform this function. It is to be appreciated that PIs that work with eight, 16, or 32 phases, etc. can also be used, but a four-phase PI will be discussed herein for ease of explanation. The PI's four input signals are two pairs of complementary phases—0 & 180 and 90 & 270—that are denoted as I and Q for brevity. Together, these four phases comprise a quadrature clock signal. The PI generates an output clock whose phase $\theta_{out}$ is a weighted sum of its input phases, $\theta_{out}=\alpha \cdot \theta I + (1-\alpha) \cdot \theta Q$, where $0 \leq \alpha \leq 1$.

These quadrature phases should be spaced evenly over a clock period (separated by 90 degrees), but due to circuit, fabrication, or operating non-idealities, may not be. For example, phases 90 and 270 may in fact be only 85 and 265 degrees away, respectively, from phase 0. Such a phase error or skew causes integral nonlinearity (INL) in the PI output clocks; INL means the phase of the PI output deviates from the ideal position over one or more values of $\alpha$. This timing error causes some bits in the sampled bitstream to be sampled earlier or later than desired (e.g., earlier or later than the midpoint of the bits' transitions). In the case of a SerDes macro, this timing error may degrade the bit-error rate. The degree of degradation caused by this timing skew grows more severe as the data rate of operation increases. Consequently, high-speed data converters and SerDes macros may require a skew-correction circuit to maintain the quadrature phase relationship between clock phases.

The conventional way of generating four quadrature clock phases for the PI is by using a phase-locked loop (PLL) circuit that operates at twice the macro's highest clock frequency, and then dividing the PLL output by two to produce the quadrature phases at the correct frequency. In various embodiment, a division by two produces four, quadrature phases.

Figure 1:
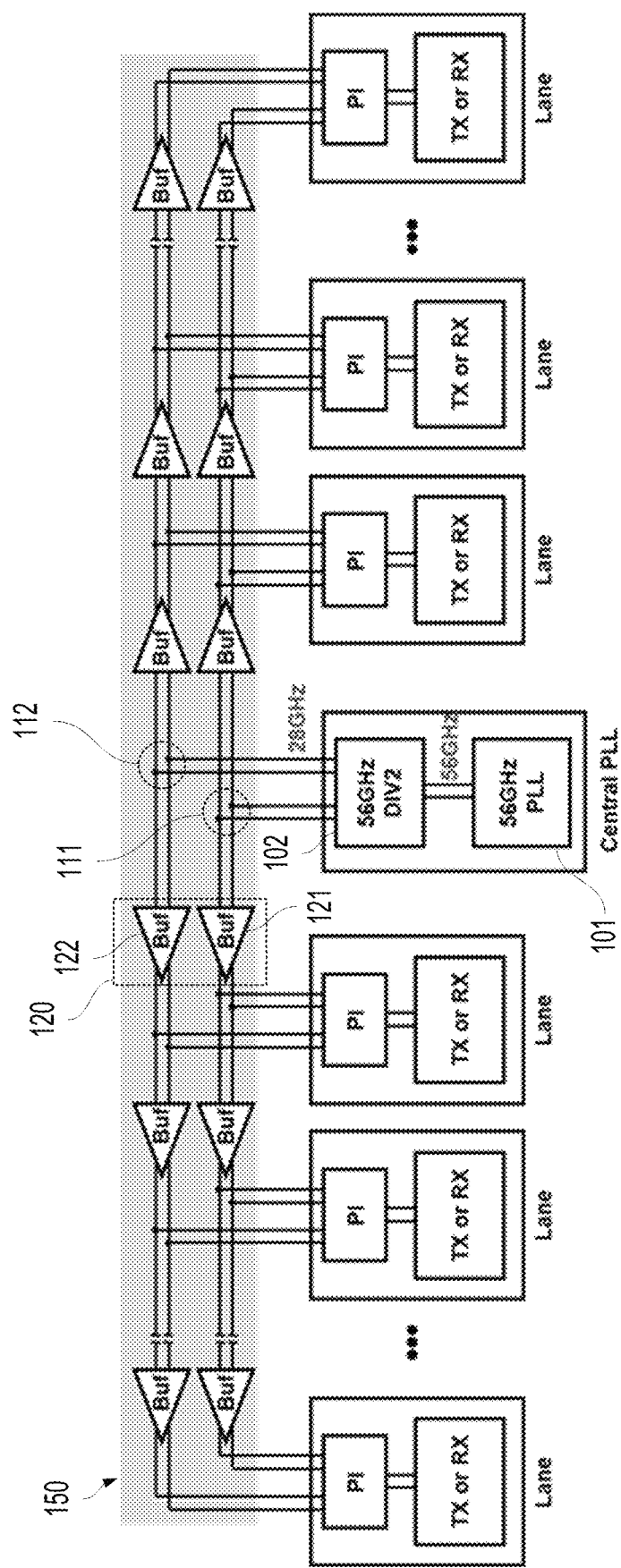
FIG. 1 is a multi-phase clock generator according to an exemplary embodiment of the disclosure, wherein a source clock at 56 GHz and a divide-by-two (DIV2) circuit are used to centrally generate four clock phases distributed to different transmit (TX) and receive (RX) lanes.

Refer now to the exemplary embodiment of FIG. 1, wherein a multi-phase clock generator according to an exemplary embodiment of the disclosure is shown. As shown in FIG. 1, a source clock at 56 GHz and a divide-by-two (DIV2) circuit are used to centrally generate four clock phases distributed to different transmit (TX) and receive (RX) lanes. As shown in FIG. 1, a 56 GHz PLL 101 and divide-by-two circuit (DIV2) 102 are used to generate the quadrature about 28 GHz clock phases of 0 & 180 111 and 90 & 270 112 degrees for a half-rate 112 Gb/s PAM4 SerDes. Phases are distributed in a distribution network 150 to different transmit (TX) or receive (RX) lanes.

Figure 2:
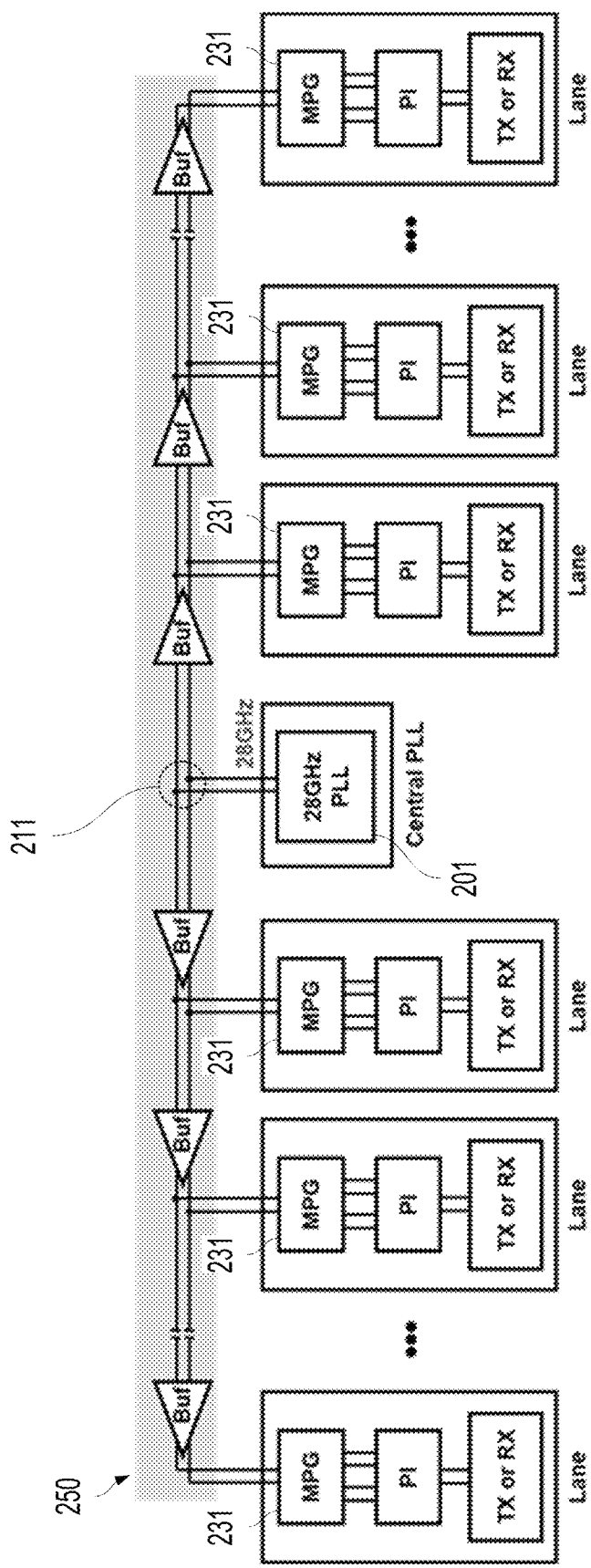
FIG. 2 is a multi-phase clock generator according to an exemplary embodiment of the disclosure, wherein a source clock at about 28 GHz centrally generates two evenly-spaced clock phases and remaining phases are generated locally in TX/RX lanes with multi-phase generator (MPG) circuits.

Refer now to the exemplary embodiment of FIG. 2, wherein an about 28 GHz PLL 201 directly generates 0 & 180 degree clock phases 211 without a DIV2 circuit. Additional clock input phases (e.g., at 90 degrees and 270 degrees) are generated locally in the TX/RX lanes, as discussed further below. This approach has advantages compared to the exemplary embodiment depicted in FIG. 1. FIG. 2 is a multi-phase clock generator according to an exemplary embodiment of the disclosure, wherein a source clock at about 28 GHz (e.g., 28 GHz PLL 201) centrally generates two evenly-spaced clock phases and remaining phases are generated locally in TX/RX lanes with multi-phase generator (MPG) circuits 231.

For example, the embodiment of FIG. 2 consumes less power, occupies less die area, and is less susceptible to on-chip noise and other circuit non-idealities. The power consumed by a 56 GHz PLL and 56 GHz DIV2 can be very high; an about 28 GHz PLL with no DIV2 is more power efficient. Significant additional power savings result from not having to distribute four about 28 GHz phases from the PLL, which is usually centrally located on a die, to the macro's TX and RX lanes. In the embodiment of FIG. 1, distributing high-frequency clocks over a long on-chip interconnect typically requires multiple stages of high-bandwidth buffers to deliver the clocks to all the lanes with sufficient signal swing and SNR. These buffers individually consume significant power and so buffering two phases instead of four halves the distribution power.

The area occupied by the conventional distribution network can also be significant, which increases die size and IC fabrication costs. At high frequencies, the buffer stages are typically resonant circuits, meaning they use an inductor to increase high-frequency gain and drive the clocks with sufficient strength. Resonant circuits typically occupy large die area because the inductors themselves are large structures, and because inductors usually must be spaced far from neighboring circuits to prevent noise in these circuits from magnetically coupling into and corrupting the clocks. Spacing circuits far apart increases the distance the clocks and various other high-frequency signals must travel, which in turn necessitates higher-power circuits to overcome this additional loss. The interconnect between stages usually behaves as a transmission line at high frequencies and occupies significant area because the signal traces are drawn with wide metal and spaced far apart. The distribution network 250 in the embodiment of FIG. 2 on the other hand occupies considerably less area.

Coupling between the buffer stages themselves can also introduce skew. In the conventional scheme of FIG. 1, each buffer 120 typically consists of one differential buffer 121 for phases 0 and 180 and another differential buffer 122 for phases 90 and 270. Any coupling, whether magnetic or capacitive or both, between these two circuits and the interconnect between them exerts a pulling effect that causes one phase or pair of phases to be pulled away from the desired 90° phase spacing. The coupling can be reduced by spacing the circuits farther apart, but at the expense of more die area. The embodiment of FIG. 2 may be free from, or may significantly alleviate, this issue.

Skew can also be caused by differences between the lengths or quality of the phases' interconnects. Skew will arise between phases if, say, phases 90 and 270 must be routed over a longer and/or more resistive or capacitive length of interconnect than phases 0 and/or 180. The embodiment of FIG. 2 is much more tolerant to wiring imbalances. For one, there is not a second set of phases to keep aligned. Second, because a differential buffer by its nature rejects skew between its two complementary inputs, relatively larger wiring imbalances between its inputs can be tolerated before the clocks' SNR is affected.

The circuits and methods of the current disclosure provide advantages over the conventional scheme. Instead of using a 56 GHz PLL and a DIV2 circuit to distribute four about 28 GHz phases as in the embodiment of FIG. 1, the PLL operates at about 28 GHz as in the embodiment of FIG. 2 and no DIV2 is required. The differential about 28 GHz clock is distributed to each lane, at which point the remaining two phases are generated locally by a multi-phase generator (MPG) 221, as shown in FIG. 2. The MPG is a 28 GHz circuit and thus consumes relatively less power and area than a 56 GHz circuit.

Figure 3:
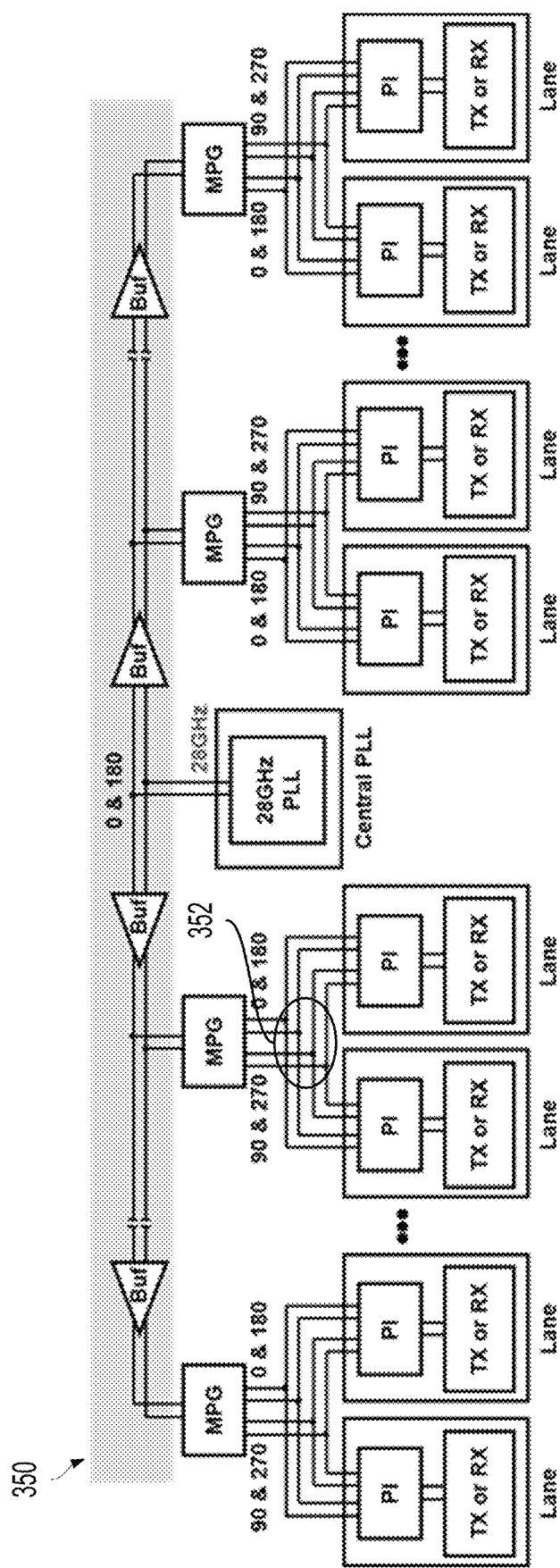
FIG. 3 is a multi-phase clock generator according to an exemplary embodiment of the disclosure, wherein a source clock at about 28 GHz centrally generates two evenly-spaced clock phases, wherein remaining phases are generated locally with multi-phase generator (MPG) circuits, and wherein each MPG is shared by two TX/RX lanes.

Refer now to the exemplary embodiment FIG. 3 wherein a multi-phase clock generator according to an exemplary embodiment of the disclosure is illustrated. As shown in FIG. 3, a source clock at about 28 GHz centrally generates two evenly-spaced clock phases, wherein remaining phases are generated locally with multi-phase generator (MPG) circuits, and wherein each MPG is shared by two TX/RX lanes. As shown in the distribution network 350 of FIG. 3, each MPG can drive two lanes 352 instead of one to amortize its power and area over more lanes. In some embodiments, each MPG may drive additional lanes to further amortize or spread its power and area over the lanes.

Figure 4:
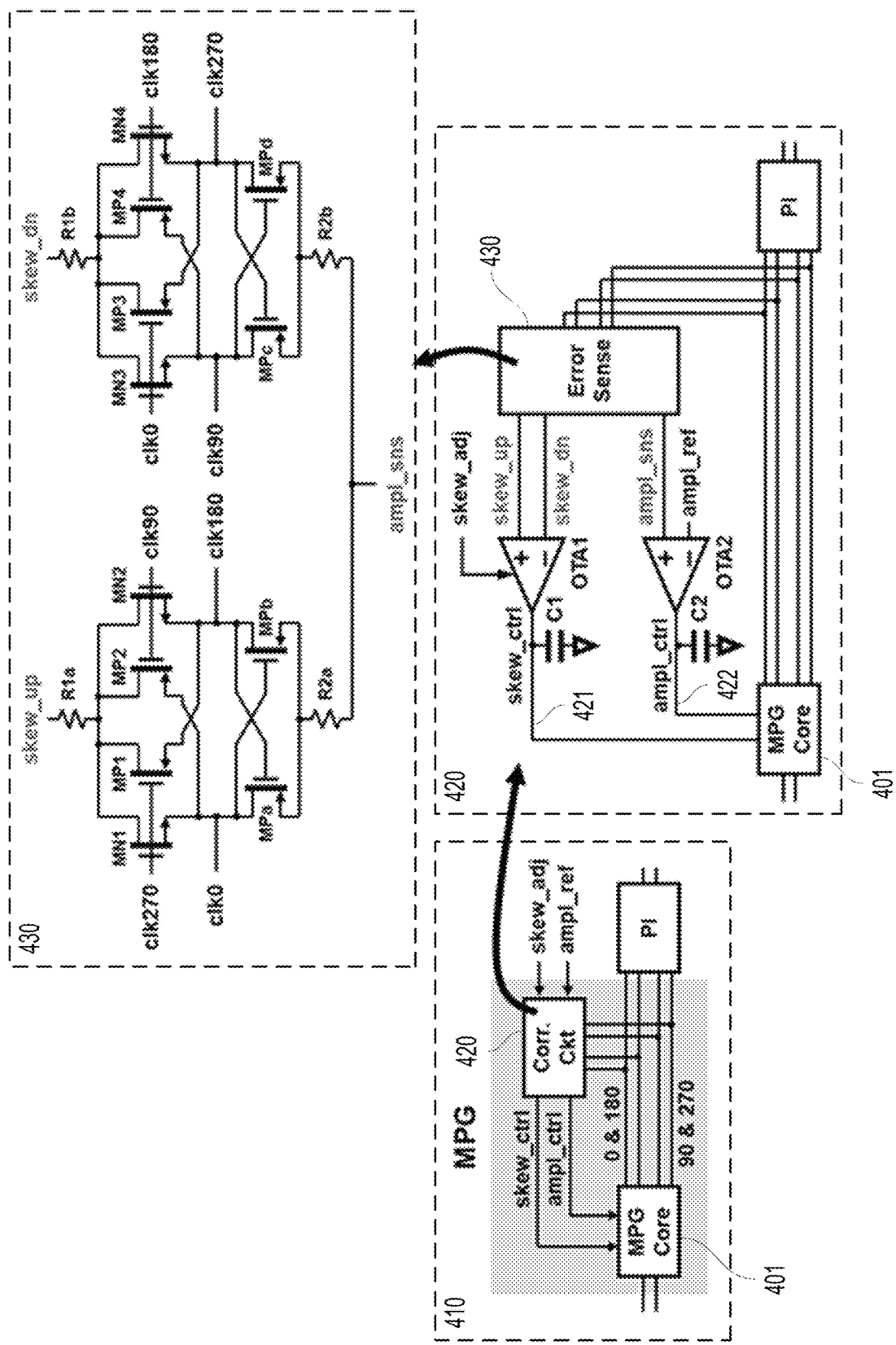
FIG. 4 is a clock phase skew and amplitude error sensing circuit according to an exemplary embodiment of the current disclosure.

Refer now to the exemplary embodiment of FIG. 4. FIG. 4 is a clock phase skew and amplitude error sensing circuit according to an exemplary embodiment of the disclosure. In some embodiments, the combined skew and amplitude-error sensing circuit 430 of the MPG 410 may detect the error characteristics of the MPG's output in two domains: the skew among the MPG's four phases, i.e. in the time domain, and the error in the amplitude of the phases with respect to a desired signal amplitude, i.e. in the voltage domain. The correction circuit 420 generates independent error signals in response to each domain error: 'skew_ctrl' 421 in response to timing error and 'ampl_ctrl' 422 in response to amplitude error. These signals are connected back to the MPG's core 401 in two feedback loops: one cancels the MPG output's skew and the other cancels its amplitude error. The correction circuit consumes very little power, occupies little area, and imposes only a small amount of additional capacitive load on the MPG's outputs.

As shown in FIG. 4, skew may be detected in the error-sensing circuit by transistors MN1 and MP1 through MN4 and MP4. These transistors may mix the four clock phases and generate the differential output pair 'skew_up' & 'skew_dn.' Resistors R1a and R1b attenuate high-frequency components in up and dn. In further embodiments, additional transistors may be used (e.g., for additional clock phases), and different combinations of resistors may be used (e.g., for varying levels of skew adjustments). Signals 'skew_up' and 'skew_dn' are compared by OTA1 and the resulting error signal it produces is integrated on capacitor C1 and fed back to the MPG core 401. OTA1 has an auxiliary input for signal 'skew_adj,' which when enabled injects an offset into the OTA that causes the loop to settle with the clock phases having non-zero skew. This auxiliary signal can be used for testing or debugging.

Amplitude error may be sensed by transistors MPa, MPb, MPc, and MPd and resistors R2a and R2b, which together rectify the clock signals and produce signal 'ampl_sns.' This signal is fed into a feedback circuit constructed similarly to that of the skew-correction loop. Control signal 'ampl_ctrl' may be fed back to an input of MPG core that controls its signal amplitude. An auxiliary input could be built into OTA2 to allow the amplitude to be adjusted higher or lower than the desired value.

In some embodiments, generating multiple phases locally at each lane means the correction circuit can be placed at the PI input node. This arrangement may help reduce the possibilities of, or a severity of, skew in the PI inputs, and/or may help ensure that the PI inputs are at or closer to a desired amplitude. In contrast, if the correction circuit were instead placed at an upstream node, skew or amplitude error introduced by the downstream buffers would not be corrected because these errors would be outside of the correction loops.

The MPG core may have different implementations in various embodiments. Refer now to the embodiment of FIG. 5 wherein an MPG core is implemented as an injection-locked oscillator (ILO) circuit. For example, FIG. 5 is an injection-locked oscillator circuit implementing an MPG core circuit according to an exemplary embodiment of the current disclosure.

Figure 5:
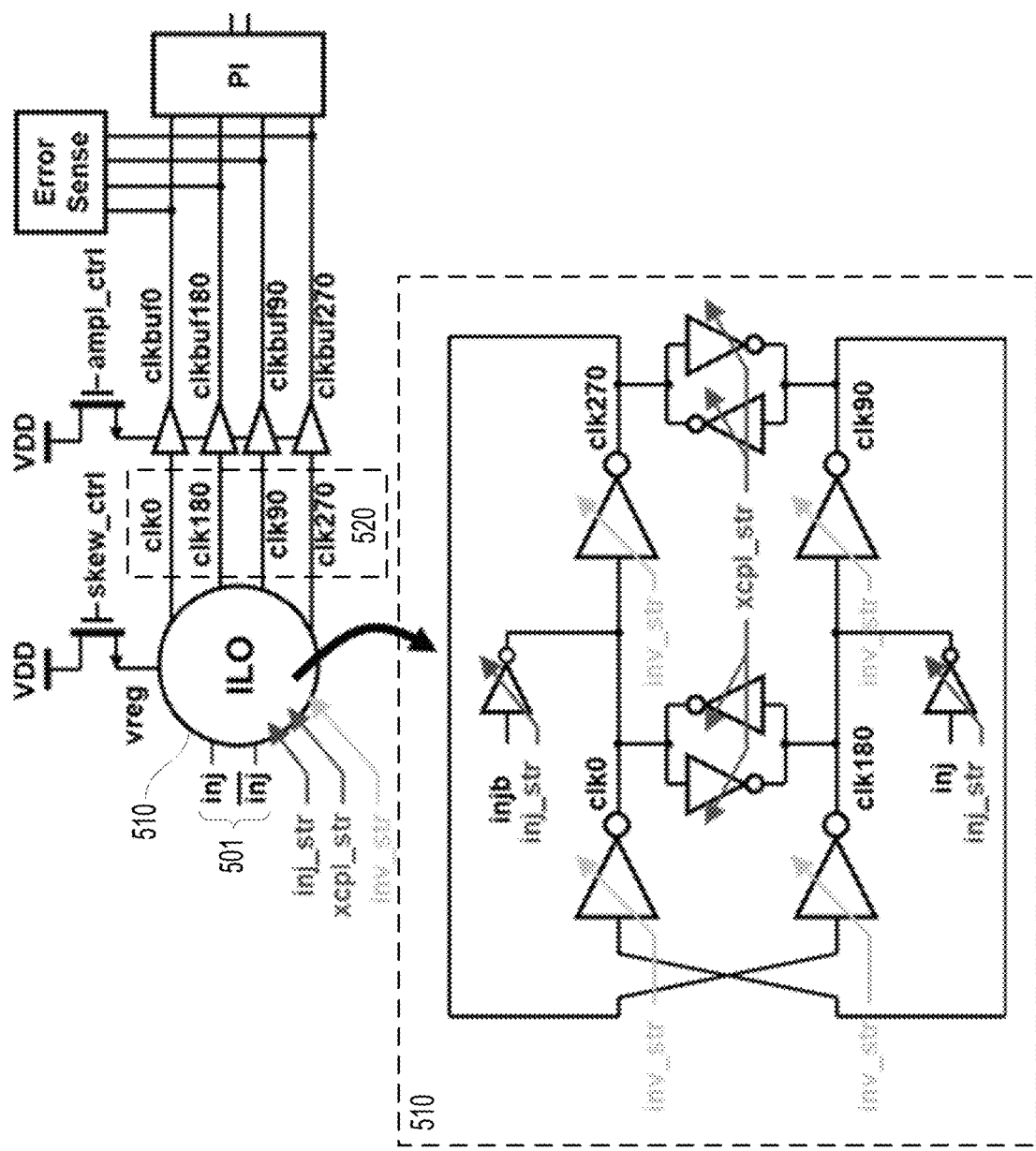
FIG. 5 is an injection locked-oscillator circuit implementing an MPG core circuit according to an exemplary embodiment of the current disclosure.

As shown in the embodiment of FIG. 5, an ILO 510 generates multiple clock phases at a frequency that has some relation to the frequency of its input "injection" clock signal 501. In this implementation, the injection signal is the 28 GHz clock generated by the PLL, and the ILO generates four phases 520 that are also at 28 GHz. (An ILO can in general produce an output frequency at a higher or lower multiple of the injection frequency, and can also produce more than four phases, e.g. eight, 16, etc.) The ILO in this implementation is not a resonant circuit and thus can operate over a wider frequency range than can a resonant circuit that is tuned to a narrow frequency range. ILO circuits have the further benefit of suppressing the noise of their constituent devices, meaning they provide a relatively low-noise solution for a given area and power consumption.

In some embodiments, the MPG core is a poly-phase filter and the 'skew_ctrl' feedback signal modulates a delay element within the filter to adjust the output phase spacing.

In some embodiments, such as in the exemplary embodiment of FIG. 5, the 'skew_ctrl' signal drives a voltage regulator which sets the ILO's internal supply voltage 'vreg.' Modulating 'vreg' adjusts the skew between the 0 & 180 phases and the 90 & 270 phases of the ILO. An increase to 'vreg' reduces the propagation delay through the inverters, thus advancing phases 90 & 270 relative to 0 & 180. Decreasing 'vreg' has the opposite effect. The MPG's skew feedback loop locks when the inverter delay equals one-fourth of the input frequency, i.e. when the ILO's natural frequency of oscillation is made equal to that of the injection signal's frequency. At lock, the four phases are spaced apart by 90°.

The amplitude error feedback signal 'ampl_ctrl' controls the ILO's output swing. In the embodiment of FIG. 5, it drives a voltage regulator that sets the internal supply voltage of buffers that sit at the ILO's output. In another implementation, it adjusts a delay element, e.g. a trimmed capacitor bank, connected to the buffer's outputs. Regardless of implementation, this signal adjusts the output swing of the MPG core's four outputs in tandem and thus does not affect the skew between them. The amplitude loop locks when the sensed amplitude is equal to the desired amplitude. Because the error-sensing circuit generates skew and amplitude error information independently, each loop locks independent of the other.

In the embodiment of FIG. 4 the feedback circuits are analog loops in which each error signal is accumulated onto a capacitor and then fed back directly to the ILO's control inputs. In other embodiments, the feedback circuits are digital loops, in which each error signal is sampled and digitized, generating digital up or down signals that are accumulated in two counter circuits, one for skew and one for amplitude. The outputs of the counters are each converted to analog signals by a small DAC built into the ILO. Other permutations of analog and digital loop can also be used.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC 112, sixth paragraph. Absent a recital of "means for" in the claims, such claims should not be construed under 35 USC 112. Limitations from the specification are not intended to be read into any claims, unless such limitations are expressly included in the claims.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

What is claimed is:

1. A system for multiphase clock generation, the system comprising:
   a phase interpolator (PI) circuit comprising a plurality of PIs for adjusting a clock timing based on a plurality of input clock phases received from a clock-and-data recovery (CDR) circuit; and
   the CDR circuit, wherein the CDR circuit comprises:
      a phase-locked loop (PLL) circuit centrally located on the CDR circuit; and
      a plurality of multiphase generators, wherein each multiphase generator is local to a respective PI of the plurality of PIs;
         wherein the PLL circuit centrally generates input clock phases at 0 and 180 degrees for the PI circuit;
         wherein the plurality of input clock phases includes the input clock phases at 0 and 180 degrees; and
         wherein the plurality of multiphase generators locally generate remaining input clock phases of the plurality of input clock phases for the PI circuit.

2. The system of claim 1, wherein the PLL circuit and the plurality of multiphase generators each operate at the highest frequency of the CDR circuit.

3. The system of claim 1, wherein the PLL circuit and the plurality of multiphase generators each operate at about 28 GHz.

4. The system of claim 1, further comprising:
   a plurality of lanes for transmitting, from the CDR circuit to the PI circuit, the plurality of input clock phases,
      wherein the plurality of lanes comprises one or more central lanes and a plurality of local lanes;
      wherein the PLL circuit generates the input clock phases at 0 and 180 degrees on the one or more central lanes;
      wherein the plurality of multiphase generators locally generate the remaining input clock phases on the plurality of local lanes;
      wherein each of the plurality of multiphase generators and the PLL circuit are evenly spaced.

5. The system of claim 1, wherein each PI of the plurality of PIs is associated with a transmit (TX) lane and a receive (RX) lane.

6. The system of claim 1, wherein each multiphase generator of the plurality of multiphase generators comprises:
   a clock phase skew sensing circuit; and
   an amplitude error sensing circuit.

7. The system of claim 1, wherein each multiphase generator further comprises an injection-locked oscillator (ILO) circuit, wherein the ILO circuit generates multiple clock phases at frequencies that are multiples of a frequency of an input clock phase associated with the multiphase generator.

8. The system of claim 1, wherein one or both of the clock phase skew sensing circuit or the amplitude error sensing circuit adjusts an internal supply voltage of the ILO circuit.

9. The system of claim 1, wherein the remaining input clock phases generated by the plurality of multiphase generators are at 90 and 270 degrees.

10. The system of claim 1, wherein the remaining input clock phases generated by the plurality of multiphase generators are at 45, 90, 135, 225, 270, and 315 degrees.

11. A method for multiphase clock generation, the method comprising:
   facilitating, by a phase interpolator (PI) circuit comprising a plurality of PIs, transfer of information across one or both of a transmit (TX) lane or a receive (RX) lane, wherein the transfer of information is based on a clock timing;
   receiving, by the PI circuit, from a clock-and-data recovery (CDR) circuit, a plurality of input clock phases, wherein the CDR circuit comprises a phase-locked loop (PLL) circuit and a plurality of multiphase generators, wherein each multiphase generator of the plurality of multiphase generators is adjacent to a respective PI of the plurality of PIs; and
   adjusting, by the PI circuit and based on the plurality of input clock phases, the clock timing.

12. The method of claim 11, wherein the receiving the plurality of input clock phases comprises:
   receiving, from the PLL circuit, input clock phases at 0 and 180 degrees.

13. The method of claim 11, wherein the PLL circuit and the plurality of multiphase generators each operate at the highest frequency of the CDR circuit.

14. The method of claim 11, wherein the PLL circuit and the plurality of multiphase generators each operate at about 28 GHz.

15. The method of claim 12, wherein the receiving the plurality of input clock phases further comprises:
   receiving, from the multiphase generators, input clock phases at 90 and 270 degrees.

16. A system for multiphase clock generation, the system comprising:
   a phase interpolator (PI) circuit comprising a plurality of PIs, wherein each PI is associated with a transmit (TX) lane and a receive (RX) lane;
   a plurality of multiphase generators, wherein each multiphase generator is local to a respective PI of the plurality of PIs; and
   a phase-locked loop (PLL) circuit that is centrally located relative to the plurality of PIs;
      wherein the PI circuit is configured to:
         facilitate transfer of information across one or both of a transmit (TX) lane or a receive (RX) lane;

receive, from the plurality of multiphase generators and the PLL circuit, a plurality of input clock phases, wherein the PLL circuit generates input clock phases at 0 and 180 degrees; and adjust, based on the plurality of input clock phases, a clock timing for the transfer of information.

17. The system of claim 16, wherein the plurality of multiphase generators generate input clock phases at 90 and 270 degrees.

18. The system of claim 16, wherein each multiphase generator of the plurality of multiphase generators comprises:

a clock phase skew sensing circuit; and an amplitude error sensing circuit.

19. The system of claim 18, wherein each multiphase generator further comprises an injection-locked oscillator (ILO) circuit, wherein the ILO circuit generates multiple clock phases at frequencies that are multiples of a frequency of an input clock phase of the plurality of input clock phases.

20. The system of claim 19, wherein one or both of the clock phase skew sensing circuit or the amplitude error sensing circuit adjusts an internal supply voltage of the ILO circuit.

\* \* \* \* \*